US012565109B1

(12) United States Patent
Vassallo et al.

(10) Patent No.: US 12,565,109 B1
(45) Date of Patent: Mar. 3, 2026

(54) ELECTRONIC DRIVE MODULE HAVING DUAL COAXIAL MOTORS AND CLUTCH DISCONNECT

(71) Applicant: FCA US LLC, Auburn Hills, MI (US)

(72) Inventors: Marco Vassallo, Turin (IT); Gregory Mordukhovich, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/819,453

(22) Filed: Aug. 29, 2024

(51) Int. Cl.
*B60L 15/20* (2006.01)
*B60K 1/02* (2006.01)
*B60K 17/02* (2006.01)

(52) U.S. Cl.
CPC ............ *B60L 15/2054* (2013.01); *B60K 1/02* (2013.01); *B60K 17/02* (2013.01); *B60L 2220/12* (2013.01); *B60L 2220/42* (2013.01)

(58) Field of Classification Search
CPC ....... B60K 1/02; B60K 17/02; B60L 15/2054; B60L 2220/42
See application file for complete search history.

(56) References Cited

U.S. PATENT DOCUMENTS

2006/0037792 A1* 2/2006 Boss ..................... B60L 3/0061
180/65.6
2019/0248247 A1* 8/2019 Yamaguchi .............. B60K 1/02

2021/0086612 A1* 3/2021 Imamura .................. B60K 1/02
2021/0178892 A1* 6/2021 Payne ..................... B60K 17/02
2024/0131923 A1* 4/2024 Sigmon .................. B60K 17/02
2024/0262189 A1* 8/2024 Hiereth ................. B60K 7/0007
2024/0351418 A1* 10/2024 Schilder .............. B60K 17/046
2024/0401682 A1* 12/2024 Haerter .................. B60K 1/00
2024/0408955 A1* 12/2024 Jasud .................... B60W 10/02

FOREIGN PATENT DOCUMENTS

CN        115465068 A  * 12/2022
CN        118457187 A  *  8/2024
DE    102022209064 A1  *  2/2024
DE    102023003545 A1  *  3/2024    ........... B60K 17/046
KR       2022148433 A  * 11/2022    ............... B60K 1/02

* cited by examiner

*Primary Examiner* — Stacey A Fluhart
(74) *Attorney, Agent, or Firm* — Jeremy J. Klobucar

(57) ABSTRACT

An electrified powertrain that generates and transfers drive torque to a driveline of an electrified vehicle is provided. The electrified powertrain includes an electric drive module (EDM), and a controller. The EDM includes a first electric motor having a first output drivingly coupled to a first output shaft that drives a first drive wheel; a second electric motor having a second output selectively coupled to a second output shaft that drives a second drive wheel; and a clutch. The clutch moves between a first position that decouples the second electric motor from the second output shaft and couples the first and second output shafts to each other; and a second position that couples the second electric motor to the second output shaft and decouples the first and second output shafts from each other. The controller controls operation of the clutch based on operating conditions.

8 Claims, 6 Drawing Sheets

| | E-Motors | | Clutch | |
| --- | --- | --- | --- | --- |
| | EM1 (PM or IM) | EM2 (PM) | Position 1 | Position 2 |
| Launch/Max Power/City Cycle | X | X | | X |
| Highway Cycle | X | | X | |
| Turning | X | X | | X |

| E-Motors | | | Clutch | |
| --- | --- | --- | --- | --- |
| EM1 (PM or IM) | EM2 (IM) | | Position 1 | Position 2 |
| Launch/Max Power/City Cycle | X | X | | | X |
| Highway Cycle | X | | | X | |
| Turning | X | X | | | X |

| | E-Motors | | | Clutch (EM or HEM) | |
|---|---|---|---|---|---|
| | EM1 (PM or IM) | EM2 (IM) | | Open (Default) | Closed |
| Launch/Max Power/City Cycle | X | X | | X | |
| Highway Cycle | X | | | | X |
| Turning | X | X | | X | |

|  | E-Motors | | Clutch A (EM or HEM) | | Clutch B (COWC) | |
|---|---|---|---|---|---|---|
|  | EM1 (PM or IM) | EM2 (PM) | Open (Default) | Closed | Locked (Default) | Free Rolling |
| Launch/Max Power/City Cycle | X | X | X |  | X |  |
| Highway Cycle | X |  |  | X |  | X |
| Turning | X | X | X |  | X |  |

| | E-Motors | | Clutch (COWC) | |
|---|---|---|---|---|
| | EM1 (PM or IM) | EM1 (IM) | Free Rolling (Default) | Locked |
| Launch/Max Power/City Cycle | X | X | | X |
| Highway Cycle | X | | X | |
| Turning | X | X | | X |

ELECTRONIC DRIVE MODULE HAVING DUAL COAXIAL MOTORS AND CLUTCH DISCONNECT

FIELD

The present application generally relates to electrified vehicles and, more particularly, to an electric drive module having dual coaxial electric motors and a clutch for selectively disconnecting at least one of the electric motors based on operating conditions.

BACKGROUND

An electrified vehicle (hybrid electric, plug-in hybrid electric, range-extended electric, battery electric, etc.) includes at least one battery system and at least one electronic drive module having at least one electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive gearbox assembly can be configured in many ways to achieve various gear ratios for accessing during specific drive conditions. In some dual motor examples however it can be inefficient operating both motors concurrently providing more power and torque than is needed. Accordingly, while such electronic drive modules do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module (EDM), and a controller. The EDM includes a first electric motor having a first output drivingly coupled to a first output shaft that drives a first drive wheel; a second electric motor having a second output selectively coupled to a second output shaft that drives a second drive wheel; and a clutch. The clutch moves between a first position that decouples the second electric motor from the second output shaft and couples the first and second output shafts to each other, wherein in the first position drive torque is provided to the first and second drive wheels exclusively from the first electric motor; and a second position that couples the second electric motor to the second output shaft and decouples the first and second output shafts from each other, wherein in the second position the first electric motor drives the first drive wheel and the second electric motor drives the second drive wheel. The controller controls operation of the clutch based on operating conditions.

In some implementations, the electrified powertrain includes a first reducer disposed between the first output shaft and the first drive wheel; and a second reducer disposed between the second output shaft and the second drive wheel.

In some implementations, at least one of the first and second electric motors are induction motors In some implementations, at least one of the first and second electric motors are permanent magnet motors In some implementations, the clutch is a dog clutch.

In additional aspects, the clutch is a one of a multi-plate electromagnetic and hydro-electric magnetic clutch In additional features, the clutch collectively comprises a first multi-plate clutch; and a second controllable one way clutch (COWC). In the first position the first clutch is closed and the second clutch is free rolling. In the second position, the first clutch is open and the second clutch is locked.

In examples, the first and second electric motors are coaxially arranged.

In additional features, the controller is configured to command the clutch to operate in the first position based on low torque operating conditions.

In other features, the controller is configured to command the clutch to operate in the second position based on high torque request operating conditions.

In additional aspects, the controller is configured to command the clutch to operate in the second position based on turning torque request operating conditions.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in some EDM's having dual motors, it can be inefficient operating both motors concurrently providing more power and torque than is needed. In particular, in some prior art dual motor configurations, both motors provide all power and torque during full driving cycles and are on all the time regardless of the required power and torque. For example, during high speed highway driving where only low torque is necessary, operating both electric motors is inefficient.

The instant disclosure provides an EDM that incorporates two coaxial electric motors and a clutch. The EDM is configured to operate in two modes for optimal efficiency. In a first mode, the clutch disconnects both motors from each other when maximum power and torque is necessary. Each motor is connected to respective output shafts. In a second mode, control commands one motor to operate while commanding the other motor off. Energy losses are reduced while operating with one motor off. In the second mode, control actuates the clutch to connect the operating motor to both output shafts. Both motors can be commanded on when torque vectoring is needed.

Figure 1:
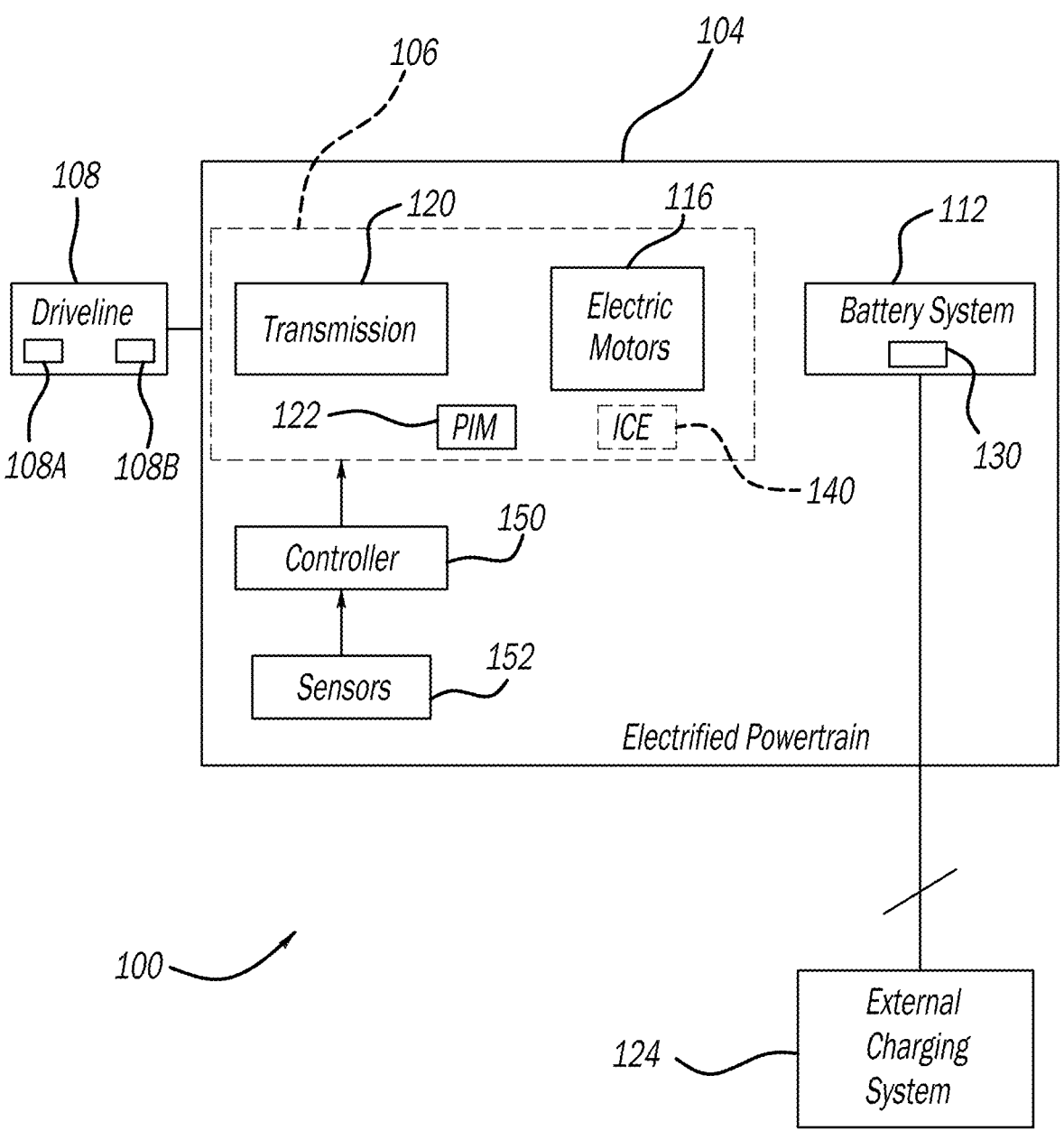
FIG. 1 is a functional block diagram of an electrified vehicle having an electronic drive module (EDM) according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes two electric motors, collectively identified at 116 (e.g., electric traction motors), an electric drive gearbox assembly or transmission, collectively identified at 120, and power electronics including a power inverter module (PIM) 122.

The electric motors 116 are selectively connectable via the PIM 124 to a high voltage battery system 112 for powering the electric motors 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140. A controller 150 can provide various inputs to the EDM 106, based on signals received from sensors 152 to operate the EDM in various modes based on operating conditions as described herein.

With additional reference now to FIGS. 2A and 2B, an EDM 106 constructed in accordance to a first example of the present disclosure will be described. The EDM 106 includes a first electric motor 116A, a second electric motor 116B and a clutch 170. The clutch 170 can be a dog clutch or other clutch configuration. As will become appreciated, the dog clutch 170 operates with two on positions of engagement (when the first electric motor 116A is a permanent magnet (PM) motor). The first and second electric motors 116A and 116B selectively communicate drive torque to reducers 120A and 120B that are respectively coupled to the driveline 108 for driving first and second drive axles 108A, 108B. The EDM 106 includes a first output shaft 180A drivingly coupled to a first output 172A of the first electric motor 116A and a second output shaft 180B selectively coupled to a second output 172B of the second electric motor 116B. The clutch 170 further selectively connects the first and second output shafts 180A, 180B.

Figures 2A, 2B:
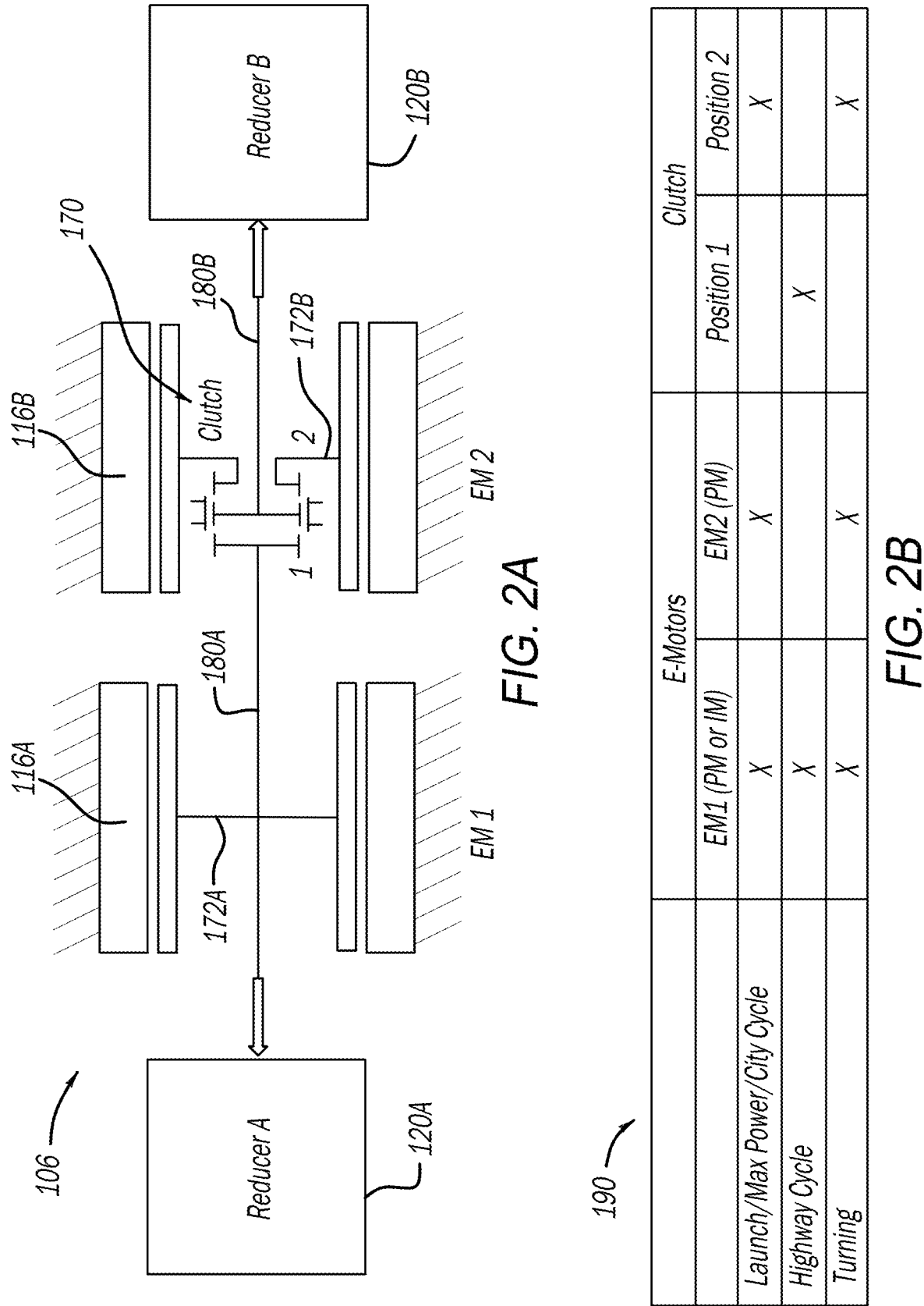
FIG. 2A is schematic illustration of an EDM having a clutch configuration according to a first example of the present application.
FIG. 2B is a table illustrating various operating modes used by the EDM of FIG. 2A according to various principles of the present application.

As shown in the Table 190 of FIG. 2B, the EDM 106 can be operated in various modes by actuating the clutch 170 between a first position and a second position. In examples, the clutch 170 can be commanded to actuate based on a signal from the controller 150. In the first position, the clutch 170 decouples the second electric motor 116B from the second output shaft 180B and couples the first and second output shafts 180A and 180B to each other. In this first position, the first electric motor 116A exclusively provides torque input through the reducers 120A, 120B to the driveline 108.

As identified above, the first position can be used when full torque is not necessary, such as, but not limited to highway driving. In this first position, the second electric motor 116B can be turned off saving power and running the EDM 106 more efficiently. In the second position, the clutch 170 couples the second electric motor 116B to the second output shaft 180B and decouples the first and second output shafts 180A and 180B from each other. In the second position, the first electric motor 116A drives the first output shaft 180A, the first reducer 120A and the drive wheel 108A. Similarly, the second electric motor 116B drives the second output shaft 180B, the second reducer 120B and the drive wheel 108B.

With additional reference now to FIGS. 3A and 3B, an EDM 206 constructed in accordance to a second example of the present disclosure will be described. The EDM 206 includes a first electric motor 216A, a second electric motor 216B and a clutch 270. The clutch 270 can be a dog clutch or other clutch configuration. As will become appreciated, the dog clutch 270 operates with two on positions of engagement (when the first electric motor 116A is an induction motor (IM)). The first and second electric motors 216A and 216B selectively communicate drive torque to reducers 220A and 220B that are respectively coupled to the driveline 108 for driving first and second drive axles 108A, 108B. The EDM 206 includes a first output shaft 280A drivingly coupled to a first output 272A of the first electric motor 216A and a second output shaft 280B selectively coupled to a second output 272B of the second electric motor 216B. The clutch 270 further selectively connects the first and second output shafts 280A, 280B.

Figures 3A, 3B:
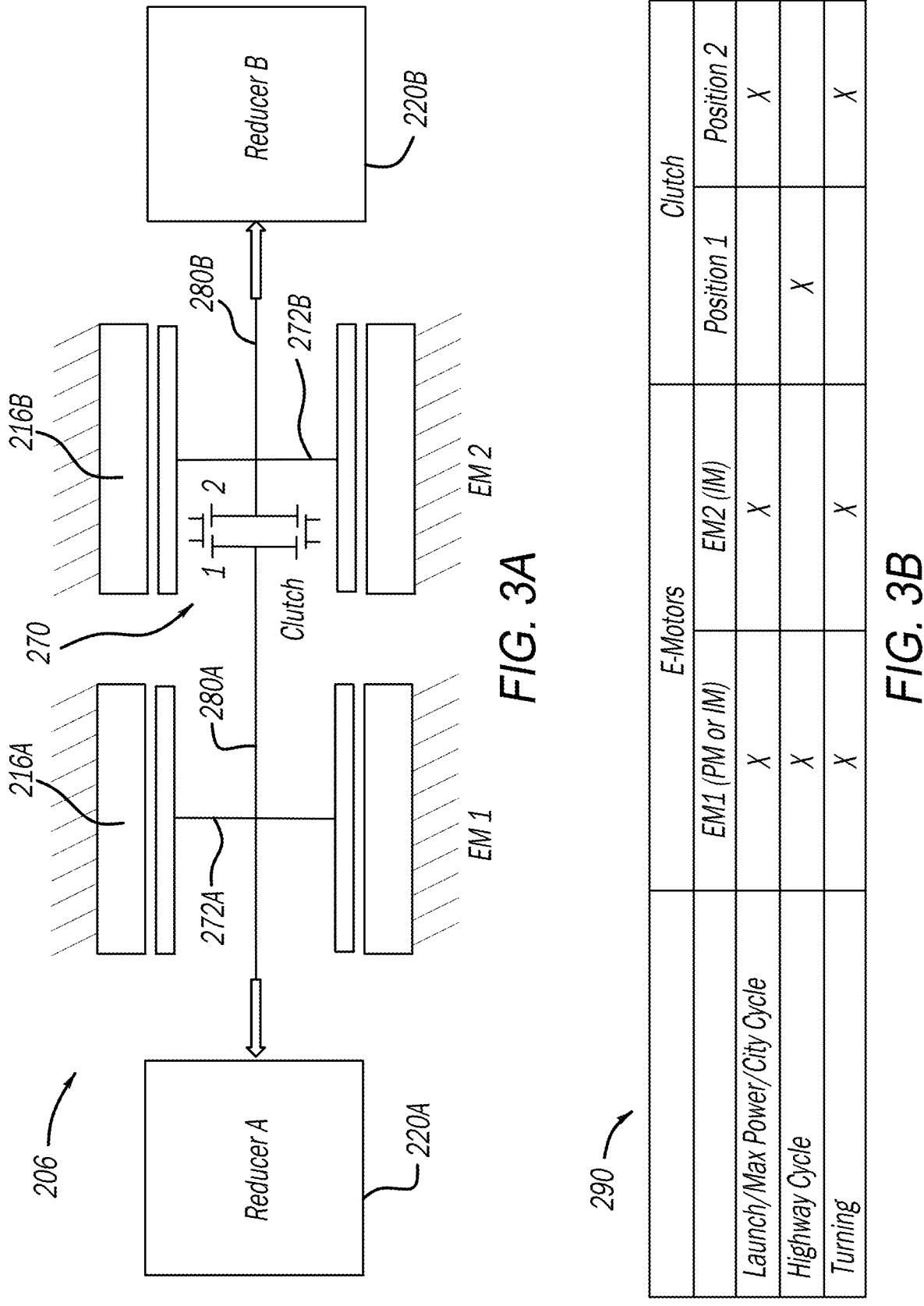
FIG. 3A is schematic illustration of an EDM having a clutch configuration according to a second example of the present application.
FIG. 3B is a table illustrating various operating modes used by the EDM of FIG. 3A according to various principles of the present application.

As shown in the Table 290 of FIG. 3B, the EDM 206 can be operated in various modes by actuating the clutch 270 between a first position and a second position. In examples, the clutch 270 can be commanded to actuate based on a signal from the controller 150. In the first position, the clutch 270 decouples the second electric motor 216B from the second output shaft 280B and couples the first and second output shafts 280A and 280B to each other. In this first position, the first electric motor 216A exclusively provides torque input through the reducers 220A, 220B to the driveline 108. As identified above, the first position can be used when full torque is not necessary, such as, but not limited to highway driving. In this first position, the second electric motor 216B can be turned off saving power and running the EDM 206 more efficiently. In the second position, the clutch 270 couples the second electric motor 216B to the second output shaft 280B and decouples the first and second output shafts 280A and 280B from each other. In the second position, the first electric motor 216A drives the first output shaft 280A, the first reducer 220A and the drive wheel 108A. Similarly, the second electric motor 216B drives the second output shaft 280B, the second reducer 220B and the drive wheel 108B.

With additional reference now to FIGS. 4A and 4B, an EDM 306 constructed in accordance to a third example of the present disclosure will be described. The EDM 306 includes a first electric motor 316A, a second electric motor 316B and a clutch 370. The clutch 370 can be a multi-plate electromagnetic or hydro-electric magnetic clutch or other clutch configuration. The first and second electric motors 316A and 316B selectively communicate drive torque to reducers 320A and 320B that are respectively coupled to the driveline 108 for driving first and second drive axles 108A, 108B. The EDM 306 includes a first output shaft 380A drivingly coupled to a first output 372A of the first electric motor 316A and a second output shaft 380B selectively coupled to a second output 372B of the second electric motor 316B. The clutch 370 further selectively connects the first and second output shafts 380A, 380B.

Figures 4A, 4B:
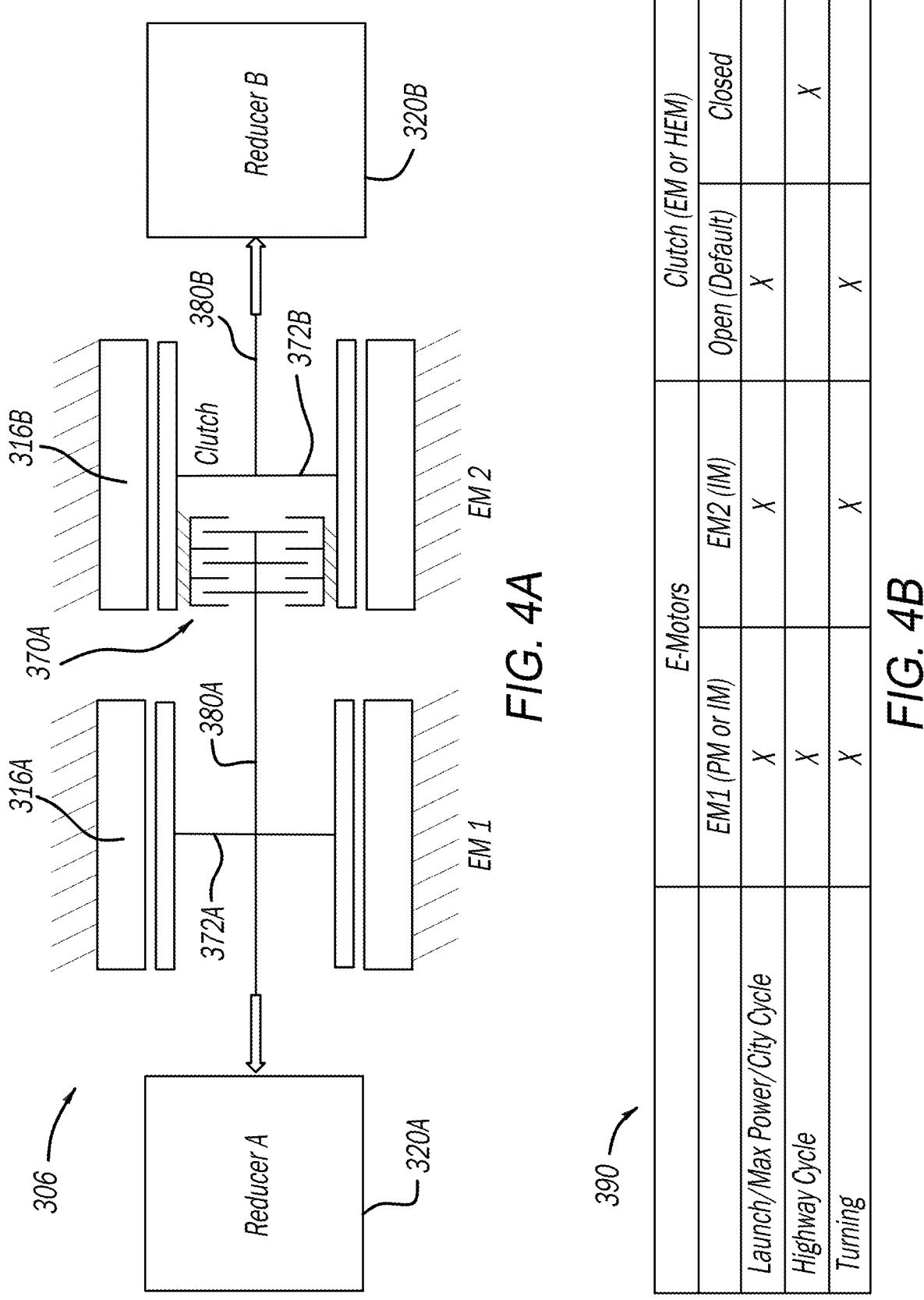
FIG. 4A is schematic illustration of an EDM having a clutch configuration according to a third example of the present application.
FIG. 4B is a table illustrating various operating modes used by the EDM of FIG. 4A according to various principles of the present application.

As shown in the Table 390 of FIG. 4B, the EDM 306 can be operated in various modes by actuating the clutch 370 between a first position and a second position. In examples, the clutch 370 can be commanded to actuate based on a signal from the controller 150. In the first position, the clutch 370 decouples the second electric motor 316B from the second output shaft 380B and couples the first and second output shafts 380A and 380B to each other. In this first position, the first electric motor 316A exclusively provides torque input through the reducers 320A, 320B to the driveline 108. As identified above, the first position can be used when full torque is not necessary, such as, but not limited to highway driving. In this first position, the second electric motor 316B can be turned off saving power and running the EDM 306 more efficiently. In the second position, the clutch 370 couples the second electric motor 316B to the second output shaft 380B and decouples the first and second output shafts 380A and 380B from each other. In the second position, the first electric motor 316A drives the first output shaft 380A, the first reducer 320A and the drive wheel 108A. Similarly, the second electric motor 316B drives the second output shaft 380B, the second reducer 320B and the drive wheel 108B.

With additional reference now to FIGS. 5A and 5B, an EDM 406 constructed in accordance to a first example of the present disclosure will be described. The EDM 406 includes a first electric motor 416A, a second electric motor 416B, a first clutch 470A and a second clutch 470B. The first clutch 470A can be a multi-plate electromagnetic or hydro-electric magnetic clutch or other clutch configuration. The second clutch 470B can be a controllable one way clutch (COWC) or other configuration. The first and second electric motors 416A and 416B selectively communicate drive torque to reducers 420A and 420B that are respectively coupled to the driveline 108 for driving first and second drive axles 108A, 108B. The EDM 406 includes a first output shaft 480A drivingly coupled to a first output 472A of the first electric motor 416A and a second output shaft 480B selectively coupled to a second output 472B of the second electric motor 416B. The clutches 470A, 470B cooperate to further selectively connect the first and second output shafts 480A, 480B.

Figures 5A, 5B:
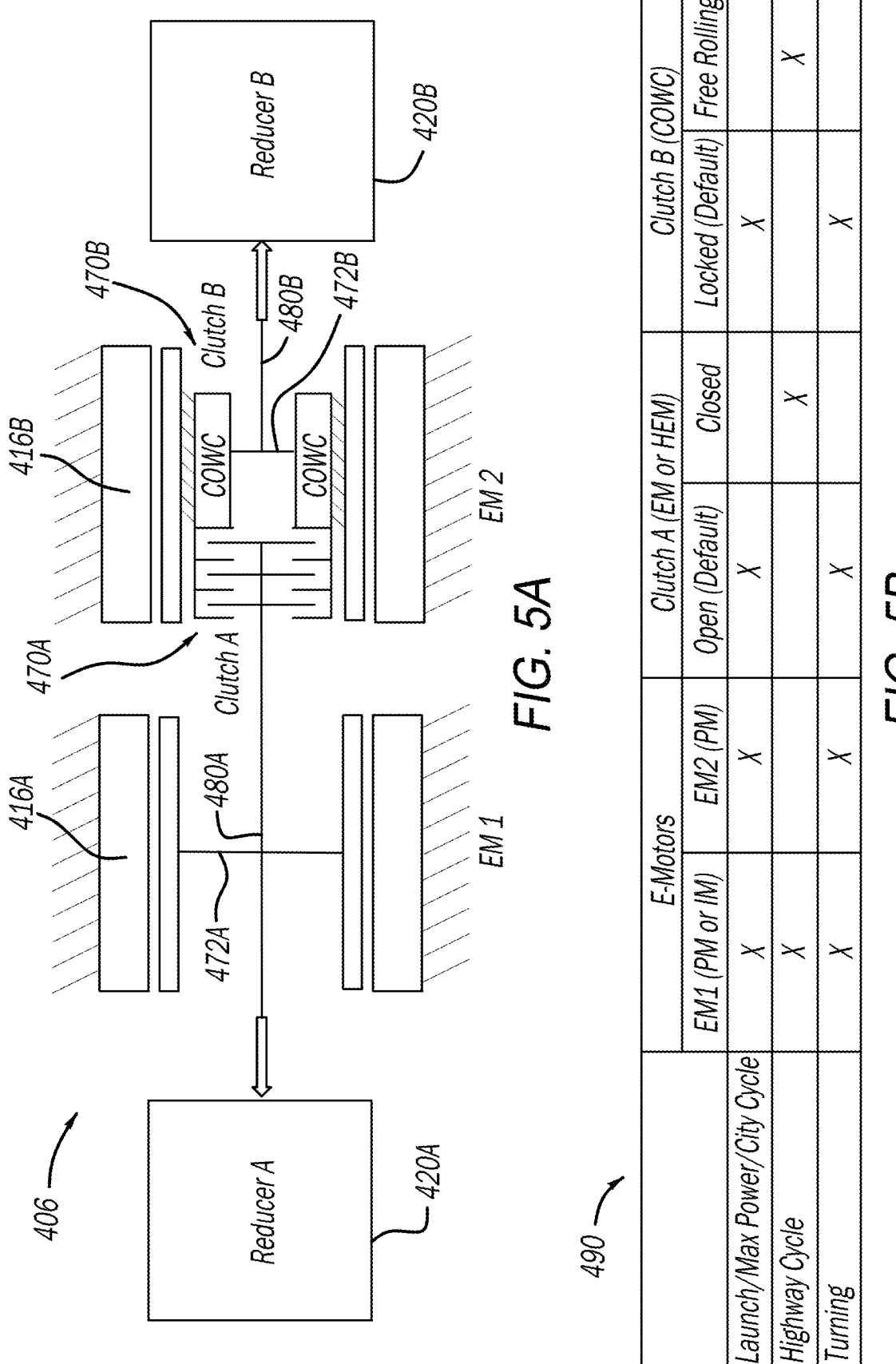
FIG. 5A is schematic illustration of an EDM having a clutch configuration according to a fourth example of the present application.
FIG. 5B is a table illustrating various operating modes used by the EDM of FIG. 5A according to various principles of the present application.

As shown in the Table 490 of FIG. 5B, the EDM 406 can be operated in various modes by actuating the clutches 470A, 470B between a first position and a second position. In examples, the clutches 470A, 470B can be commanded to actuate based on a signal from the controller 150. In the first position (clutch 470A closed, clutch 470B free rolling), the clutches 470A and 470B decouple the second electric motor 416B from the second output shaft 480B and couples the first and second output shafts 480A and 480B to each other.

In this first position, the first electric motor 416A exclusively provides torque input through the reducers 420A, 420B to the driveline 108.

As identified above, the first position can be used when full torque is not necessary, such as, but not limited to highway driving. In this first position, the second electric motor 416B can be turned off saving power and running the EDM 406 more efficiently. In the second position (clutch 470A open, clutch 470B locked), the clutches 470A and 470B couple the second electric motor 416B to the second output shaft 480B and decouple the first and second output shafts 480A and 480B from each other. In the second position, the first electric motor 416A drives the first output shaft 480A, the first reducer 420A and the drive wheel 108A. Similarly, the second electric motor 416B drives the second output shaft 480B, the second reducer 420B and the drive wheel 108B.

With additional reference now to FIGS. 6A and 6B, an EDM 506 constructed in accordance to a fifth example of the present disclosure will be described. The EDM 506 includes a first electric motor 516A, a second electric motor 516B and a clutch 570. The clutch 570 can be a COWC other clutch configuration. The first and second electric motors 516A and 516B selectively communicate drive torque to reducers 520A and 520B that are respectively coupled to the driveline 108 for driving first and second drive axles 108A, 108B. The EDM 506 includes a first output shaft 580A drivingly coupled to a first output 572A of the first electric motor 516A and a second output shaft 580B selectively coupled to a second output 572B of the second electric motor 516B. The clutch 570 further selectively connects the first and second output shafts 580A, 580B.

Figures 6A, 6B:
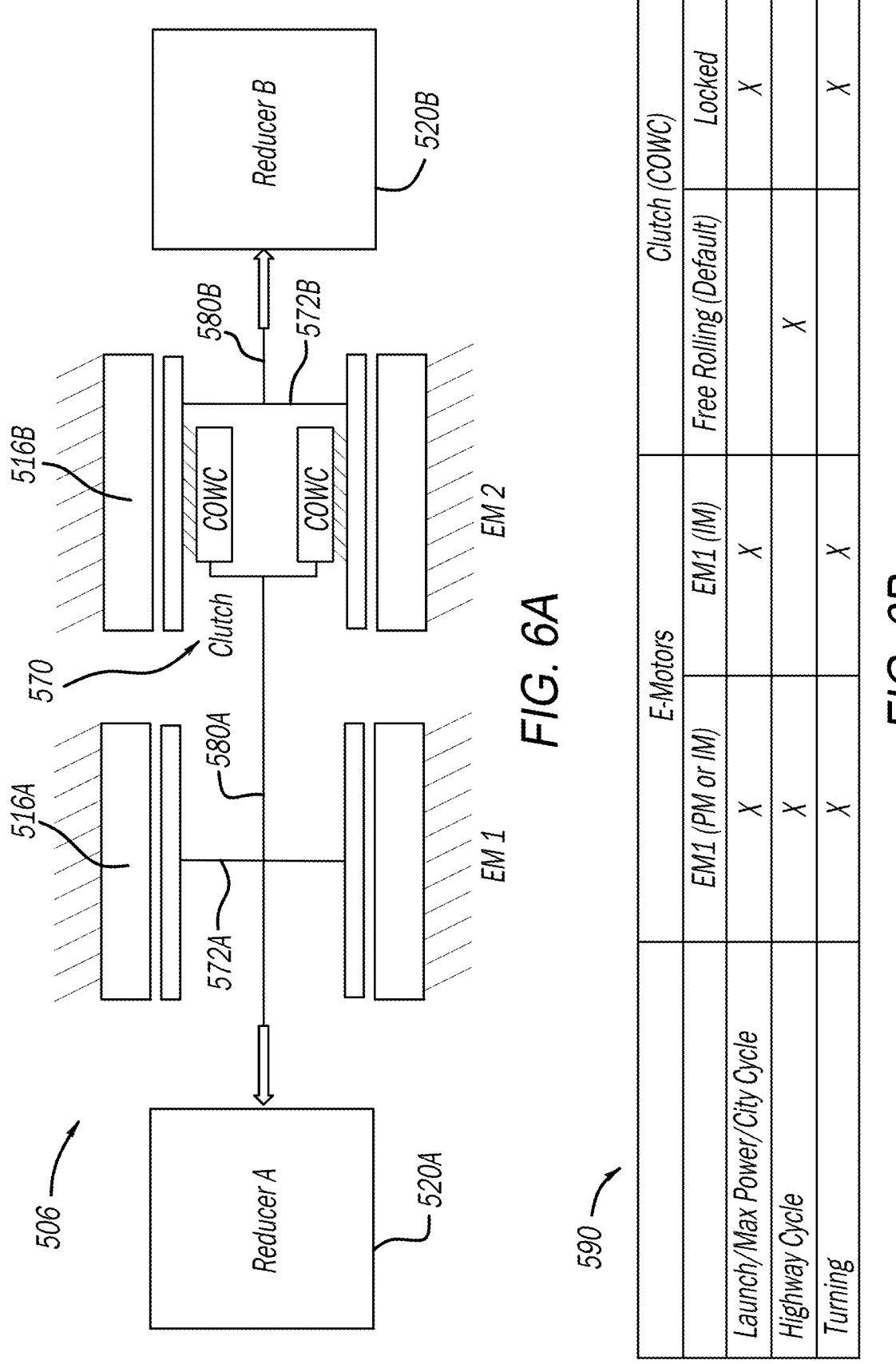
FIG. 6A is schematic illustration of an EDM having a clutch configuration according to a fifth example of the present application.
FIG. 6B is a table illustrating various operating modes used by the EDM of FIG. 6A according to various principles of the present application.

As shown in the Table 590 of FIG. 6B, the EDM 506 can be operated in various modes by actuating the clutch 570 between a first position and a second position. In examples, the clutch 570 can be commanded to actuate based on a signal from the controller 150. In the first position, the clutch 570 decouples the second electric motor 516B from the second output shaft 580B and couples the first and second output shafts 580A and 580B to each other. In this first position, the first electric motor 516A exclusively provides torque input through the reducers 520A, 520B to the driveline 108.

As identified above, the first position can be used when full torque is not necessary, such as, but not limited to highway driving. In this first position, the second electric motor 516B can be turned off saving power and running the EDM 506 more efficiently. In the second position, the clutch 570 couples the second electric motor 516B to the second output shaft 580B and decouples the first and second output shafts 580A and 580B from each other. In the second position, the first electric motor 516A drives the first output shaft 580A, the first reducer 520A and the drive wheel 108A. Similarly, the second electric motor 516B drives the second output shaft 580B, the second reducer 520B and the drive wheel 108B.

In examples, the first electric motor 116A, 216A, 316A, 416A, 516A is sized for highway operating conditions (high speed, low torque). The second electric motor 116B, 216B, 316B, 416B, 516B is sized to provide an additional torque to cover more demanding operating conditions (maximum power, maximum torque such as launch and passing on a highway), when power or torque from the first electric motor 116A, 216A, 316A, 416A, 516A is insufficient. The clutch disconnect examples disclosed herein is added to disconnect the second electric motor 116B, 216B, 316B, 416B, 516B to reducer B 120B, 220B, 320B, 420B, 520B and to connect the second electric motor 116B, 216B, 316B, 416B, 516B to reducer B 120B, 220B, 320B, 420B, 520B when the second electric motor 116B, 216B, 316B, 416B, 516B is a permanent magnet motor. When the second electric motor 116B, 216B, 316B, 416B, 516B is an induction motor, the disconnect between the second electric motor 116B, 216B, 316B, 416B, 516B and the reducer B 120B, 220B, 320B, 420B, 520B is not necessary.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:

an electric drive module comprising:

a first electric motor having a first output drivingly coupled to a first output shaft that that is coaxially arranged relative to the first electric motor and that drives a first drive wheel;

a second electric motor having a second output selectively coupled to a second output shaft that that is coaxially arranged relative to the second electric motor and that drives a second drive wheel; and a clutch that is coaxially arranged within the second electric motor and moves between:

a first position that decouples the second electric motor from the second output shaft and couples the first and second output shafts to each other, wherein in the first position drive torque is provided to the first and second drive wheels exclusively from the first electric motor; and a second position that couples the second electric motor to the second output shaft and decouples the first and second output shafts from each other, wherein in the second position the first electric motor drives the first drive wheel and the second electric motor drives the second drive wheel; and a controller that controls operation of the clutch based on operating conditions.

2. The electrified powertrain of claim 1, further comprising:

a first reducer disposed between the first output shaft and the first drive wheel; and a second reducer disposed between the second output shaft and the second drive wheel.

3. The electrified powertrain of claim 1, wherein at least one of the first and second electric motors are induction motors.

4. The electrified powertrain of claim 1, wherein at least one of the first and second electric motors are permanent magnet motors.

5. The electrified powertrain of claim 1, wherein the clutch is a dog clutch.

6. The electrified powertrain of claim 1, wherein the controller is configured to command the clutch to operate in the first position based on low torque operating conditions.

7. The electrified powertrain of claim 1, wherein the controller is configured to command the clutch to operate in the second position based on high torque request operating conditions.

8. The electrified powertrain of claim 1, wherein the controller is configured to command the clutch to operate in the second position based on turning torque request operating conditions.

* * * * *